Sheet 1, 3 Sheets.

E. G. Lamson.

Stone Channelling Mach.

No. 3,366. Reissued Apr. 13, 1869.

Witnesses
Jno. D. Patton
T. J. Chamberlain

Inventor
E. G. Lamson,
By atty. A. B. Stoughton.

Sheet 2, 3 Sheets.
E. G. Lamson.
Stone Channelling Mach.
No. 3,366. Reissued Apr. 13, 1869.
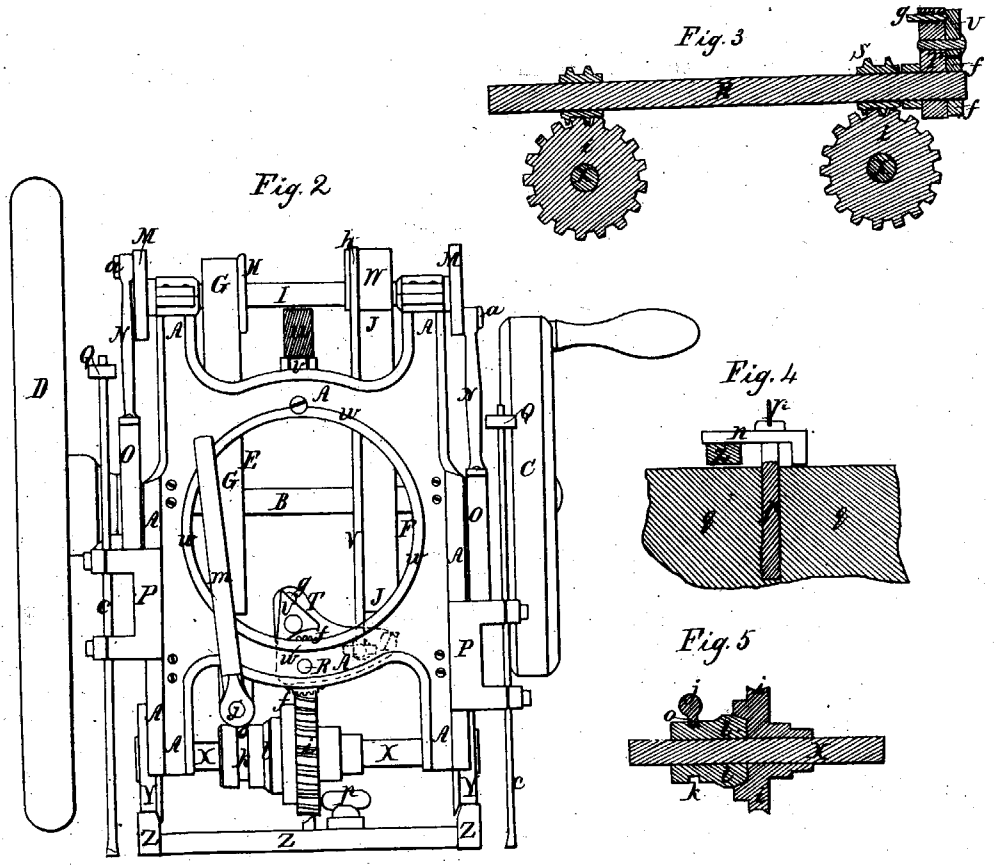
Witnesses
Jno. D. Patton
Thos. J. Chamberlain.
Inventor
E. G. Lamson,
By atty A. B. Stoughton.

Sheet 8. 3 Sheets.
E. G. Lamson.
Stone Channelling Mach.
No. 3,366. Reissued Apr. 13, 1869.
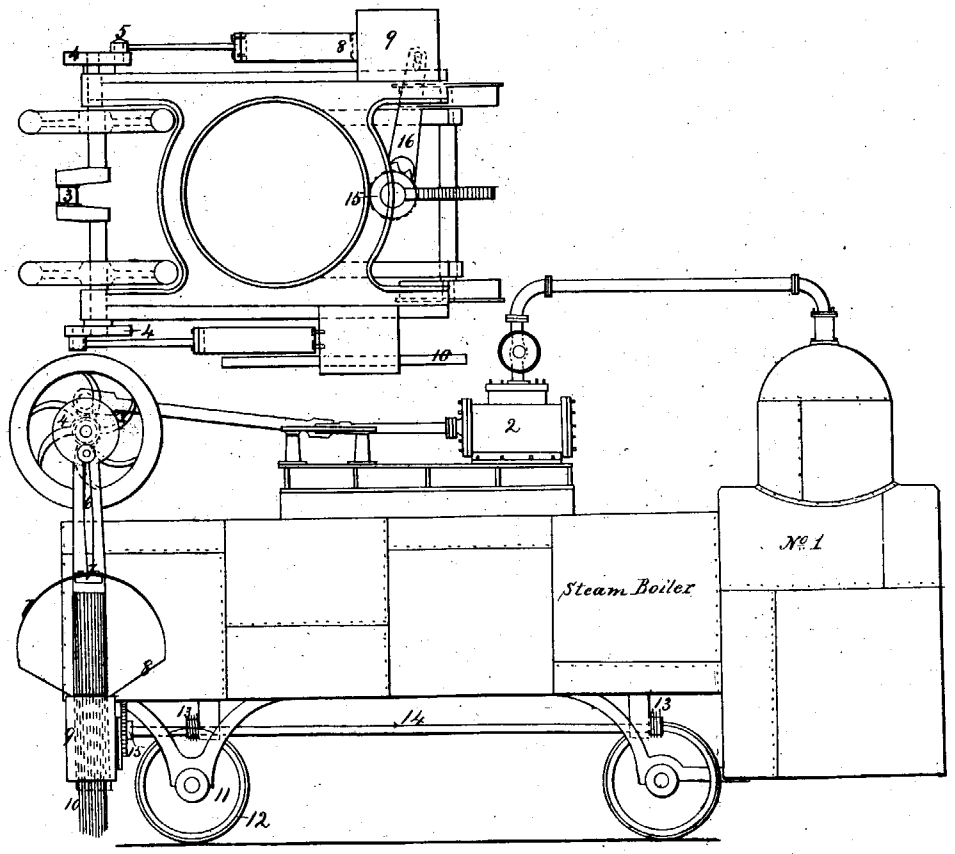
Witnesses
Jno. D. Patten
Thos. J. Chamberlain.
Inventor
E. G. Lamson,
By atty A. B. Stoughton.

United States Patent Office.

EBENEZER G. LAMSON, OF SHELBURNE FALLS, MASSACHUSETTS.

*Letters Patent No.* 58,435, *dated October* 2, 1866; *reissue No.* 3,366, *dated April* 13, 1869.

IMPROVED ROCK-CHANNELLING MACHINE.

The Schedule referred to in these Letters Patent and making part of the same.

*To all whom it may concern:*

Be it known that I, EBENEZER G. LAMSON, of Shelburne Falls, in the county of Franklin, and State of Massachusetts, have invented certain new and useful Improvements in Machines for Cutting, Channelling, Tunnelling, Quarrying, or Pulverizing Rock; and I do hereby declare that the following is a full, clear, and exact description of the same, reference being had to the accompanying drawings, making a part of this specification, in which—

Figure 2 represents an elevation of one of the ends of the machine.

Figure 3 represents a section through the feeding-mechanism.

Figure 4 represents the manner of clamping the ways, or track upon which the machine moves, to the stone, or rock, to be wrought upon.

Figure 5 represents a section through one of the friction-clutches that connects with the feed-mechanism.

Similar letters of reference, where they occur in the several figures, denote like parts of the machine in all the drawings.

Figure 1:
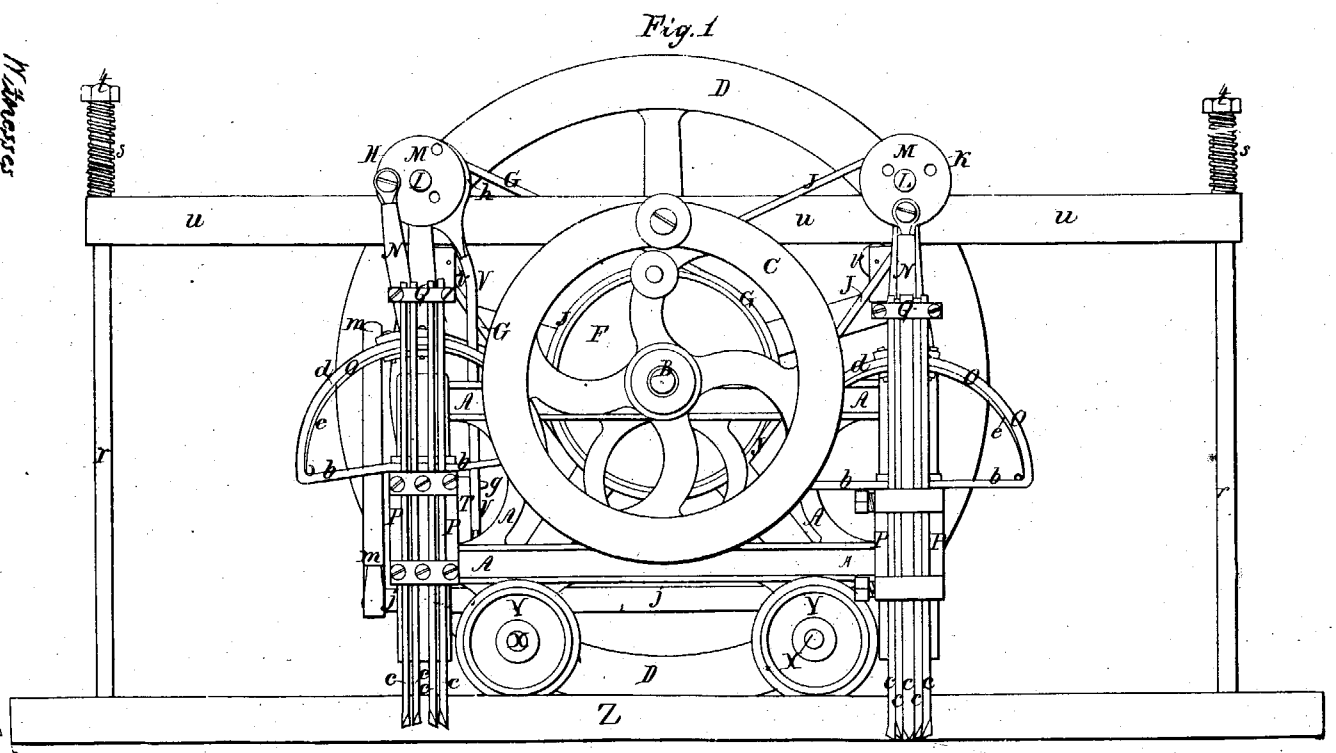
Figure 1 represents an elevation of one of the sides of the machine, the opposite side being substantially similar to that shown in this figure.

When, by operating machinery, I drive a drill, or other heavy cutting, breaking, or abrading-instrument, against rock with sufficient force and velocity to work away the stone rapidly, the blows delivered produce tremendous concussion, or jarring, which, in the absence of an elastic, or flexible instrument intervening between the driving and striking parts, soon shakes the operating-machinery to pieces, and renders it inoperative or useless.

In the present invention, I propose to remedy this mischief by interposing between them an instrument, such that the instant the striking-machinery delivers a blow, at that very same instant the driving-machinery shall be isolated, or practically disconnected therefrom.

This will, of course, prevent the concussion communicating from one to the other, and prevent the mischief in question; and, further, when drills, or cutting-tools are thrown against stone, or rock, by the reaction of a compound spring solely, the springs thus used become weakened, and as the chisels or drills reduce, or cut away the stone, they have a constant varying motion in speed and force, and no certain regularity of action.

When a positive motion is given to drills, chisels, or such other cutting, or abrading-instruments, by cams, cranks, or crank-wheels, the distance between the throw of the cams, or cranks, and the surface of the rock, or stone wrought upon varies with the surface removed, and this, too, makes irregular working, unless a very nice feed-motion is combined with it; but the positive motion is more certain and regular than the spring-motion, while the latter is more simple.

Each plan, therefore, has its advantages and disadvantages, and my object has been to avail myself of the advantages of both plans, and at the same time obviate their disadvantages; and, to this end, I combine the positive motion with a peculiar spring-motion, and thus obtain the object, as will be explained.

My invention, therefore, consists in operating the drills, rams, chisels, or cutters of a stone-cutting, channelling, quarrying, stamping, hammering, or tunnelling-machine, by imparting to them a positive motion, combined with a flexible, or spring-motion, or with both, whereby I avoid a complicated feed-motion to said tools, isolate them from the operating-mechanism, preserve the cutting-edges for a longer time, strike a heavier blow, and produce more and better work with less labor, power, and expense for repairs.

If now, to illustrate, I extend with moderate tension a strap, cord, rod, chain, or other flexible instrument, and fasten the ends thereof to a movable mechanism, by hooks, and then to the centre of said flexible instrument, attach my drills, and operate said frame to and fro, it is manifest that the strokes of the drill will be equal to the strokes of the driving-machinery, or frame, plus the extent of the vibration of the flexible instrument, and to this same extent will the drills feed downward without positive adjustment.

In operating my drills, I regulate the speed and stroke of the driving-machinery, with such reference to the extent of the flexible vibrations that the drills strike at the moment when the tension of the flexible instrument is least, or measured by zero, and I thereby break or remove the concussion, or jar of the blow from the hooks, and, at the same time, I save the edges of the drills from being destroyed to the same extent as when subjected to a positive force they must be.

By inspection, it will be seen, further, that, as the stroke of the drills is equal to the stroke of the driving-machinery, plus the extent of the vibration of the flexible instrument, the velocity of the drills in operation will be just as much greater than the velocity of the driving-machinery as is the stroke of the one greater than the stroke of the other, the time of their respective strokes being necessarily the same; and since the momentum, other things being equal, will be in proportion to the velocity given to the body striking, I am, therefore, able, by these flexible vibrations, to strike heavier and more effective blows.

From the foregoing, it is evident that the greater flexion I give to the rope, cord, or other instrument used with proper tension, the greater will be the efficiency of my machine.

For this purpose, therefore, I now hitch the flexible instrument to an elastic instrument, which shall, while producing the proper tension of the former, greatly increase the extent of its flexion.

Instead of the rigid mechanism above mentioned, I now fasten the flexible instrument to a spiral, elliptical, single, double, or to a spring made in any other form, so only that by its elasticity, I increase the extent of the flexions, or vibrations of the former, such springs, for this purpose, being simply mechanical equivalents.

By using a spring, I also obtain still another improvenient in operating drills. I thus hurl the drills against the rock by the spring's reaction, and so communicate additional velocity, and consequently give additional momentum to the blow struck, which momentum goes on to increase in a constantly-increasing ratio the faster the blows are delivered.

So, also, without a flexible medium, I may hang my drills directly to a spiral spring, or to a spring made in some other form, with a rigid connection of its two ends, and with or without a slide to give play, instead of flexions, and so obviate the need of the flexible instrument, except in so far as said flexibility may reside in the springs themselves.

Such equivalents I mentioned in my caveat, dated April 25, 1866.

Sheet 3, of the annexed drawings, shows the machine as presented in my caveat, with the boiler and engine, as well as the bow-spring movement and the worm-gear propelling power with the devices heretofore described, in a simplified manner.

The devices described heretofore, when applied to the boiler and engine, are in the form substantially as seen in this drawing.

A very important part of my invention, or office which the bow-spring performs is, that when in practical operation, the gang of drills weigh about four hundred pounds, including the clamps; that when raised by a cam, or lever striking directly upon or by a lever, the resistance is so sudden, coming upon the driving-mechanism, all at once, is very destructive, and some part soon gives way; but when the bow-spring, or its equivalent, is interposed, the driving-mechanism takes on the load so gradually that the machinery does not fail.

The machine can be run as fast again, thereby doing double the work in the same time.

It is, therefore, of the very essence of my invention to combine with the positive motion of the driving-machinery the element flexibility or elasticity, or both; and, in this invention, I have used as the best combination of these elements the flexibility of a strap, and the flexibility and elasticity of a bow-spring, without meaning to restrict myself thereto, or to either of these particular forms.

My invention further consists in the clutch and feed-mechanism, by which the machine is moved along on its track, or ways, and traversed back and forth, as will be explained.

In suitable bearings, upon a substantial cast-iron, or other frame, A, is placed the drive-shaft B, having upon one of its ends a crank, or belt-wheel, C, and upon the other end a balance, or fly-wheel, D.

Upon this drive-shaft B are placed two driving-pulleys, E and F, the belt G, of the pulley E, passing over and around a pulley, H, on a shaft, I, on the top and at one end of the frame A, and the belt J, of the pulley F, passing over and around the pulley K, on a shaft, L, on top of and at the opposite end of the frame, and through these belts G and J, the shafts I and L receive their motion.

Upon each of the ends of the shafts I and L are placed crank-wheels M M, to movable and adjustable wrist-pins *a*, in which are connected several the pitmen N, the lower ends of which are attached to the crowns of the strap bow-springs O, and to the strap or cord *b* of said bow-springs is secured the block P, that carries the series of drills, or cutters *c c c*, there being one series, or set of such drills at each corner of the machine.

The drills, or cutting-tools, it will thus be seen, are raised by means of the strap, while the bow-spring, which it surrounds or is connected with, takes off the suddenness of the rising-motion, and when the cutters, or chisels, which are raised and lowered by the crank-wheels and pitmen, (or by a positive as contradistinguished from a spring-motion,) rebound, or react, they do so against said strap, and if with any very great degree of force, then the strap is eased by the spring of the bow of which it is a part.

By the use of this strap and spring-bow connection, the throw of the crank-wrist, without being changed, will allow the cutters to cut a channel or reduce a surface to the extent of one or two inches, and still maintain a uniformity of blow or force.

The bow-springs O are of steel, while the strap *b* may be of steel, leather, or other suitable material.

When the chisels, or cutters are worked in gangs, as shown in fig. 1, their edges may stand at different angles, and thus cut a clean channel, and without forming ridges; and to keep the tools which may have round or square shanks, in proper working-position, they may be clamped at their tops, as at O, and to the blocks or guide-heads P, which move upon suitable ways in the frame.

To the lower, or under part of the frame, and at or near the centre thereof, longitudinally, is placed a shaft, R, which has two worm-gears, S S, upon it; and upon this shaft, also, there is loosely placed an arm, T, which arm has upon it a double-pivoted pawl, U, that works in a ratchet-wheel, *f*, fastened on said shaft R, said pawl being capable of working on either side of the shaft, and of being held in its adjusted and, for the time being, working-position, or in a neutral position, when it is desired, by this means, to stop feeding, by a spring-bolt, *g*, or by any other suitable device The arm T is vibrated on the shaft R, by a rod, V, connected to it, the upper end of which rod is attached, by a yoke, *h*, to a cam, W, on the shaft I.

This rod V can be adjusted on the arm T, as shown by dotted lines in fig. 2, so as to vary the motion of the arm, and consequently the pawl that moves (through certain parts to be presently described) the machine along on its track, or ways.

Underneath the machine are two supporting axles, X X, which have upon their journals, at each end, flanged wheels Y Y, that rest and move upon rails, or a track, Z, and upon these axles X X are placed the gears *i i*, into which the worms S upon the shaft R work, and by which these axles and their wheels are turned, and the whole machine moved steadily along on its track, and in the direction for which the pawl U may be set.

A second shaft, *j*, is placed at the under side of the machine, and parallel with the one, R, and has upon it projections *o*, which take into grooves *k*, made in a sleeve or semi-clutch, *l*, that moves longitudinally on a spline on each one of the shafts, or axles X, by means of the lever *m* on one end of said shaft.

The gears *i i* are loose on the axles X, and their hubs are dished, or hollowed out, as seen in fig. 5, and the end of the semi-clutch *l* turned off, to fit said dished, or hollowed-out portion.

When the semi-clutch is jammed into the gears *i i*, the gears, axles, wheels, and the entire machine, will move regularly on the ways, or track; but if the semi-clutch *l* be moved away from the recesses in the gears, by turning the shaft *j*, the machine will remain stationary.

Thus the machine may be fed along in either direction, or stopped, while the cutters, or chisels continue to work.

By means of clamps *n* and screws *p*, the track *z* is held down firmly to the rock, or stone *g* that is to be worked, and, if found necessary, the machine may be still further held to the work by rods *r r*, extending

BEST AVAILABLE COPY upward from the track, and holding, by springs *s* and nuts *t*, to a horizontal bar, *u*, that bears upon friction-rolls *v* on the machine, and thus holds it to the work without undue friction, to impede its motion back and forth on the track.

Full-size machines will have weight enough to hold themselves steadily against the working of the cutters. Lighter machines may not have.

The machine herein represented is constructed to be driven by power, at a distance from it, or by hand.

The circular openings *w*, in the ends of the frame, are to show how a steam-boiler, (which I have shown in red,) with an engine attached, may be supported and carried along with the machine, so as to be very compact and very efficient.

In this latter case I dispense with the belt-wheel and fly-wheel on the drive-shaft B, as well as with the rods *r r*.

I contemplate the use of this machine for channelling the pavements of streets, where, from use, they have become so smooth as to prevent horses from drawing heavy loads, without liability of falling, and of great injury to themselves.

In such cases, to prevent the danger of fires or of great noise, which might frighten horses, I propose to work the machine by compressed air, which can be brought, in hose or pipes, from a distance.

It will be seen from the foregoing, that I have accomplished, among other things, two objects which have not been obtained in any other machine:

First, the friction-feed, one object of which is to save the machine from breaking when it meets with any obstacle which stops the machine from moving along, and yet the engine, and all parts of the machine, are in full operation, but the driving-wheels turn on the track, and thus prevent damage to the feeding-mechanism, while a rack-and-pinion feed, or any positive feed, would be sure to break some part, provided the power of the machine were sufficient.

The second great improvement is the elastic bow-spring, or its equivalent, through which the power is applied to raise the drills, and throw them against the rock. It often occurs that the drills are caught, or, by various causes, get stuck in the channels, and require great power to raise them, and when the power is applied in a positive manner, by means of a lever or a cam, acting without the intervention of the accumulative elastic bow-spring, or its equivalent, some part of the lifting-mechanism is sure to break, but by the intervention of the accumulative spring, which operates the same, in raising the drills in channels or in throwing them against the rock, in either case, the elastic or yielding prevents the machine from breaking.

Having thus fully described my invention,

What I claim as new, and desire to secure by Letters Patent, is—

1. The combination of cutting-instruments, for working in or on stone, with the crank-wheel, attached to driving-shaft, or otherwise, and an interposed spring, or its equivalent, so as to raise and lower the mechanism, substantially as described.

2. In combination with the stone-cutting machine herein described, which is moved along upon a track, or way or ways, whilst operating upon the rock or stone, the reversible pawl and the worm-gear and clutch, so as to enable the movement of the whole machine along in either direction upon the track, or stop it at will, during the continuous action of the cutters, substantially as described.

3. The interposition of a bow-spring, or other elastic or yielding device, between the cutters, or drills and the operating-mechanism of a stone-channelling, drilling, or grooving-machine, substantially for the purposes set forth.

4. The combination of the bow-spring, or its equivalent, and the eccentric feed, with worm-gear, when operated upon wheels which run on a track, the friction of which moves the machine along, either way, upon the track, substantially as herein set forth.

5. The combination, in a stone-drilling, grooving, or channelling-machine, of an elastic or yielding instrument, of any construction, and a wrist-pin, or other device, which gives a positive movement to said elastic instrument, which is connected with drills, or cutters, substantially as set forth.

6. A stone-grooving, drilling, or channelling-machine, that is provided with a mechanism which will assist in extracting the drills, or cutters from the rock, assist in elevating the same on their upward movement, and add to their velocity or stroke on or into the stone, substantially as and for the purposes described.

7. The adjustable crank-pins *a a* in the cranks M M, whereby the stroke of the drills may be increased or diminished, substantially as described.

8. In combination with a stone-drilling, or cutting-apparatus, that is moved upon a track, a friction or equivalent clutch, operated by a lever connected to the axle of the carriage, whereby the machine may be allowed to propel along or stop, substantially as set forth.

9. Reciprocating channelling-chisels, applied to opposite sides of a carriage-bed, and driven by a crank-shaft and connecting-arm, said shaft receiving its motions from an engine which is mounted upon said carriage-bed, substantially as described.

In testimony that I claim the foregoing, I have hereunto set my hand, this day of February, 1869.

E. G. LAMSON.

Witnesses:

EDM. F. BROWN,

J. M. MASON.